United States Patent [19]

Bennett et al.

[11] Patent Number: 5,352,045
[45] Date of Patent: Oct. 4, 1994

[54] MEANS OF MOUNTING A REVOLVING CUTTING ELEMENT

[75] Inventors: Ronald Bennett, Nyon, Switzerland; Lewis J. Isaacs, Littleton; Kenneth Jump, Arvada, both of Colo.

[73] Assignee: The Integrated Bearing Co. Ltd., Tortola, British Virgin Isls.

[21] Appl. No.: 1,317

[22] Filed: Jan. 6, 1993

[51] Int. Cl.$^5$ .................................. E21B 10/22
[52] U.S. Cl. .................................. 384/96; 175/371
[58] Field of Search ........................ 384/92, 94, 96; 175/371, 373

[56] References Cited

U.S. PATENT DOCUMENTS

| | | | |
|---|---|---|---|
| 3,847,235 | 11/1974 | Goodfellow | 384/94 X |
| 4,157,122 | 6/1979 | Morris | 175/371 X |
| 4,181,377 | 1/1980 | Oelke | 384/96 |
| 4,478,299 | 10/1984 | Dorosz | 384/96 X |
| 4,625,816 | 12/1986 | Takano | 384/96 X |
| 4,874,047 | 10/1989 | Hixon | 384/96 X |
| 5,064,007 | 11/1991 | Kaalstad | 175/371 X |

Primary Examiner—Thomas R. Hannon
Attorney, Agent, or Firm—Kane, Dalsimer, Sullivan, Kurucz, Levy, Eisele & Richard

[57] ABSTRACT

In an assembly made up of a spindle formed integrally with a revolving cutting element, the longitudinal axis of the spindle being the axis of rotation of the cutting element, the spindle is set into a cylindrical bearing. The bearing is fixed in the main body of the bit. The bearing element and a plate form a thrust surface with the end of the bearing at right angles to the axis of rotation of the spindle, which the other end of the bearing element made with the flange projecting outwards is held in the cutting element by means of the retaining ring which is fixed in the cutting element. A thrust surface at right angles to the axis of the rotation of the spindle is created between the top end of the bearing element and the cutting element and another between the retaining ring and the main body of the bit. By maintaining the spindle centrally in the bearing the wear on the bearing is radically reduced.

12 Claims, 8 Drawing Sheets

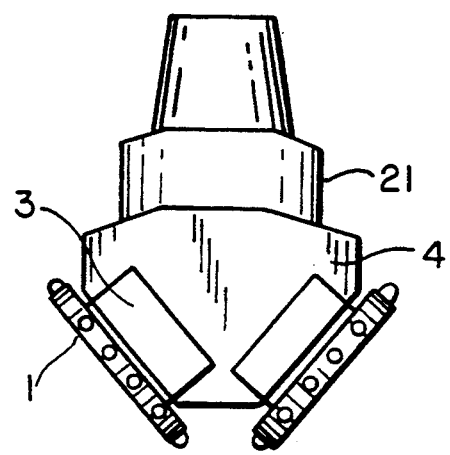
F I G. 1
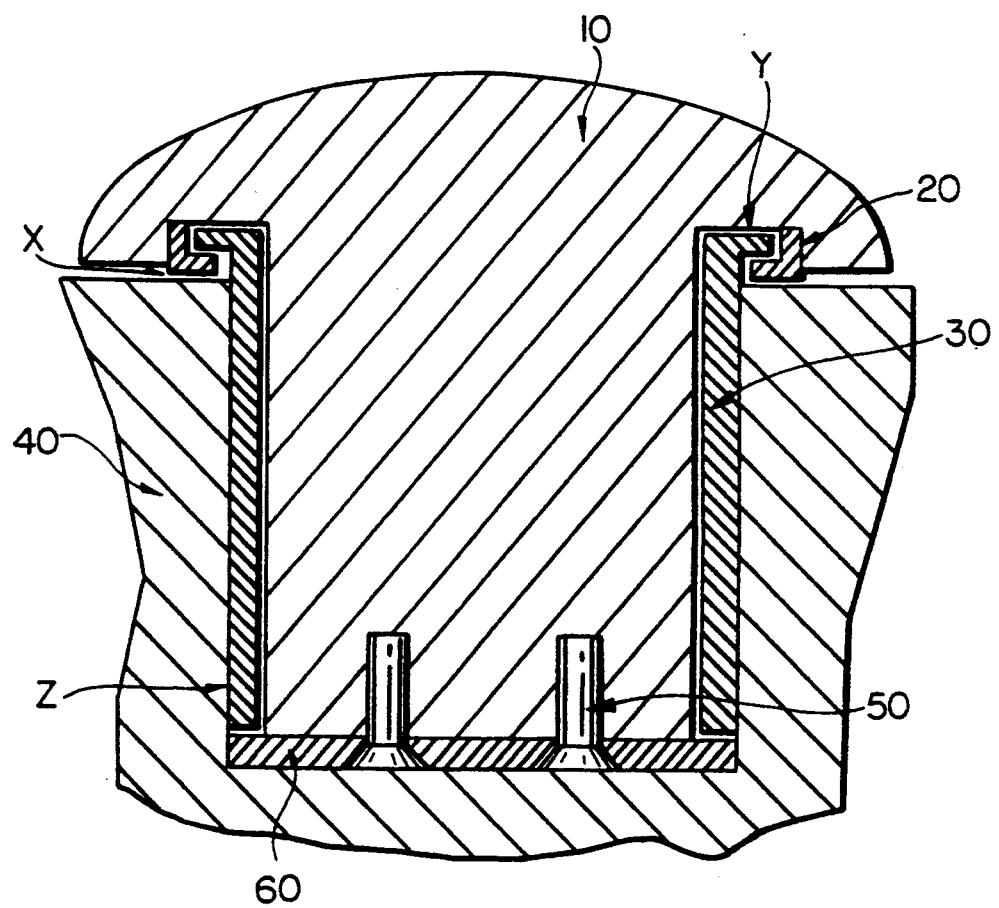
F I G. 2

MEANS OF MOUNTING A REVOLVING CUTTING ELEMENT

The present invention concerns a means of mounting a revolving element on a rotary drill bit body by means of a spindle the longitudinal axis of the spindle being the axis of rotation of the cutting element.

The predominant cause for breakdown in rotary cutting bits is failure of the bearing. Persistent early breakdown is almost certainly the main reason why no rotary bit using revolving discs as its cutting elements has yet been successfully brought to market.

Existing cutting elements in rotary bits use bearing whose thrust surfaces are parallel to the axis of rotation of the spindle. As they cut into the rock the cutting elements are subjected to powerful forces which try to move the spindles to which they are attached off center in the bearing.

The present invention concerns a means of mounting a revolving cutting element on a drill bit body by means of a spindle which is set in a bearing providing additional thrust surfaces at right angles to the axis of rotation, at each end of the spindle.

By maintaining the spindle centrally in the bearing, the present invention radically reduces the wear on the bearing, extends lifespan and makes disc bits a practical proposition.

SUMMARY OF THE INVENTION

The means of mounting a revolving cutting element on a rotary drill bit body by means of a spindle the longitudinal axis of the spindle being the axis of rotation of the cutting element according to the present invention comprise a bearing element formed by a hollow body element, into which is set the spindle, the bearing having a shape matching with this of the spindle, a plate attached to the end of the spindle and having a portion extended beyond the periphery of the end of the spindle, the end of the bearing close to the the base of the spindle is made with a flange projecting outwards intended to cooperate with a retaining ring.

The main forces of downward thrust and rotary torque exerted by the main body of the bit through the disc during the cutting action are concentrated in the lower quadrants of the disc.

The forces exerted on the disc by the rock in reaction to the downward thrust and rotary torque, applied through the disc by the main body, are such that the spindle tries to move off center in the bearing cylinder. This creates friction which generates heat, causing the bearing to act as a brake on the rotating spindle, which inhibits the performance of the disc in the rock and builds up stress between the disc and its spindle, leading to fatigue, probable seizure and breakdown.

Because the present invention establishes thrust surfaces X, Y at right angles to the axis of rotation of the spindle, situated along the back of the disc beyond the radius of the spindle, the resultant moment is radically reduced, eliminating the braking action. This allows the spindle to rotate centrally in the bearing element, avoiding fatigue and breakdown and giving the disc spindle bearing—and therefore the bit—a greatly increased and more reliable lifespan.

Any residual moment is further resisted in the thrust surface Z (FIG. 4) at the base of the spindle at right angles to it axis of rotation formed between the retaining plate and the base of the bearing element.

In the event of failure or breakage in the bearing, existing cutting elements tend to fall down the hole, necessitating costly recovery operations or even loss of the hole.

According to a preferable embodiment of the present invention the top end of the bearing element is held in the disc by a retaining ring. This prevents the disc form becoming detached from the bearing surface in the event of bearing failure. Since the bearing element is screwed or otherwise fixed into the main body of the bit, the disc cannot fall down the hole during drilling, eliminating the need for recovery operations and their attendant costs.

If the discs were to be attached to the spindle by means of a bolt or similar attachment (FIG. 5), a flex joint would exist between the disc and the top end of the spindle. The moment which tries to rotate the spindle about the fulcrum N would try to separate the disc from the spindle, creating massive stress in the bolt leading to fatigue or breakage.

According to an embodiment of the present invention the shape of the spindle and the bearing element is cylindrical.

According to another embodiment the shape of the spindle and the bearing element is conical.

The spindle may be formed integral with the cutting element which is preferably a disc, or may be formed integral with the drill body when the cutting element is preferably a cone.

In another version of the present invention, the width of the bearing element is increased and the radius of the spindle correspondingly decreased to create a larger thrust surface at right angles to the axis of the spindle between the top end of the bearing element and the disc. This enables the length of the spindle and bearing to be reduced, which leaves more space between the base of the bearings of the different discs in the main body of the bit. This enables the bit to be made in smaller diameters or used for reverse circulation drilling or coring through the center of the bit.

When the spindle is formed integral with the drill body the cutting element is preferably a cone and the bearing element is screwed or otherwise fixed into the cone.

The main downward thrust and rotating torque exerted by the main body of the bit through the cones during the cutting are concentrated along the lower side of the cones.

The forces exerted by the rock in reaction are such that the cone tries to move off center relative to the centerline of the spindle, leading rapid wear or breakdown in the bearing of fracture of the spindle.

Because the present invention establishes thrust surfaces at right angles to the axis of rotation of the spindle, these forces are inhibited from rotating the cone longitudinally about a fulcrum enabling the spindle to rotate centrally in the bearing element. This reduces wear in the bearing, avoids premature breakdown and removes the stress which causes the spindle to fracture, increasing the reliability of the bit and prolonging its life.

In the present invention the top end of the bearing cylinder is held in the main body by a retaining ring. This prevents the bearing element, and therefore the cutting element, from becoming detached from the main body and falling down the hole in the event of failure or breakdown in the bearing.

The bearing element may be a plain bearing, or a ball-bearing or a roller-bearing.

BRIEF DESCRIPTION OF THE DRAWINGS

FIG. 1 is a lateral view of a rotary drill bit.

FIG. 2 is a lateral cross sectional view of an integral disc spindle.

DETAILED DESCRIPTION

Figure 3:
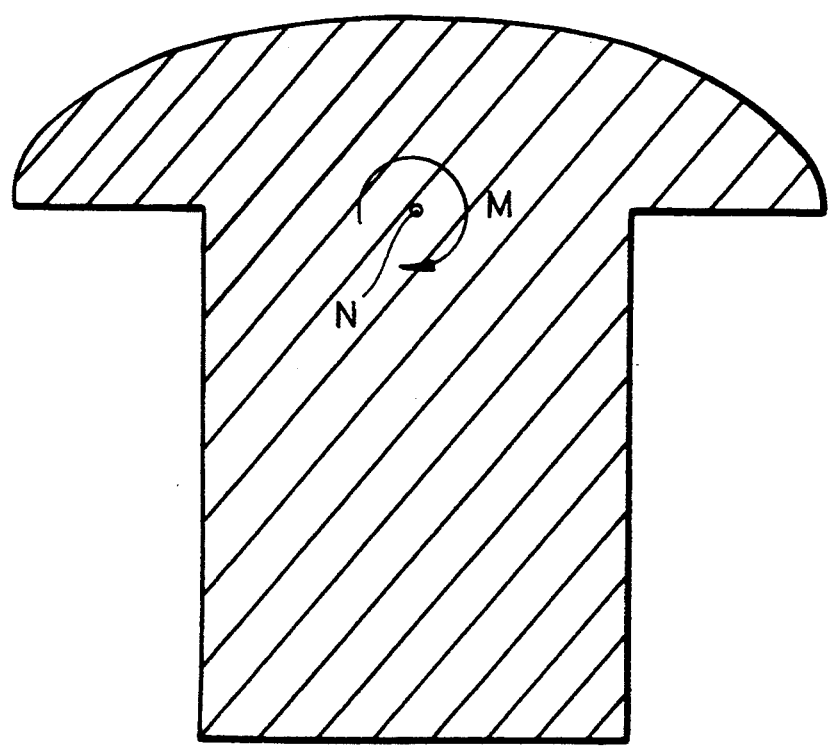
FIG. 3 is a schematic lateral cross sectional view of an integral spindle.

Although this description is limited to rotary drill bits equipped with revolving discs or cones, other kinds of revolving cutting elements correspond to the present invention.

FIG. 1 shows a rotary drill bit 21 fitted with two revolving discs 1 set in bearings 3 fixed in the main body 4.

In FIG. 2, in accordance with this invention, an integral disc spindle 10 set in a bearing cylinder 30 and held in the cylinder by a retaining plate 60 fastened to the base of the spindle by fasteners 50. The bearing cylinder is fixed in the main body of the bit 4 and is held in the disc by a retaining ring 20. The thrust surfaces at right angles to the axis of the spindle may be seen at X, Y and Z. The retaining ring 20 is screwed or otherwise fixed to the cutting element.

FIG. 3 is a schematic cross section of an integral disc spindle bearing assembly set in the main body of the bit.

The main forces of downward thrust and rotary torque exerted by the main body of the bit through the disc during the cutting action are concentrated in the lower quadrant of the disc.

The forces exerted on the disc by the rock in reaction to the downward thrust and rotary torque, applied through the disc by the main body are such that the spindle tries to move off center in the bearing cylinder. This creates friction which generates heat, causing the bearing to act as a brake on the rotating spindle, which inhibits the performance of the disc in the rock and builds up stress between the disc and its spindle, leading to fatigue, probable seizure and breakdown.

How this happens is explained in FIG. 3. The force which tries to move the spindle off center is the resultant moment M generated by the forces exerted on the lower quadrant of the disc acting about a fulcrum N on the centerline of the spindle.

Because the present invention establishes thrust surfaces at right angles to the axis of rotation of the spindle, situated along the back of the disc beyond the radius of the spindle, the resultant moment is radically reduced, eliminating the braking action. This allows the spindle to rotate centrally in the bearing cylinder, avoiding fatigue and breakdown, and giving the disc spindle bearing, and therefore the bit, a greatly increased and more reliable lifespan.

Figure 4:
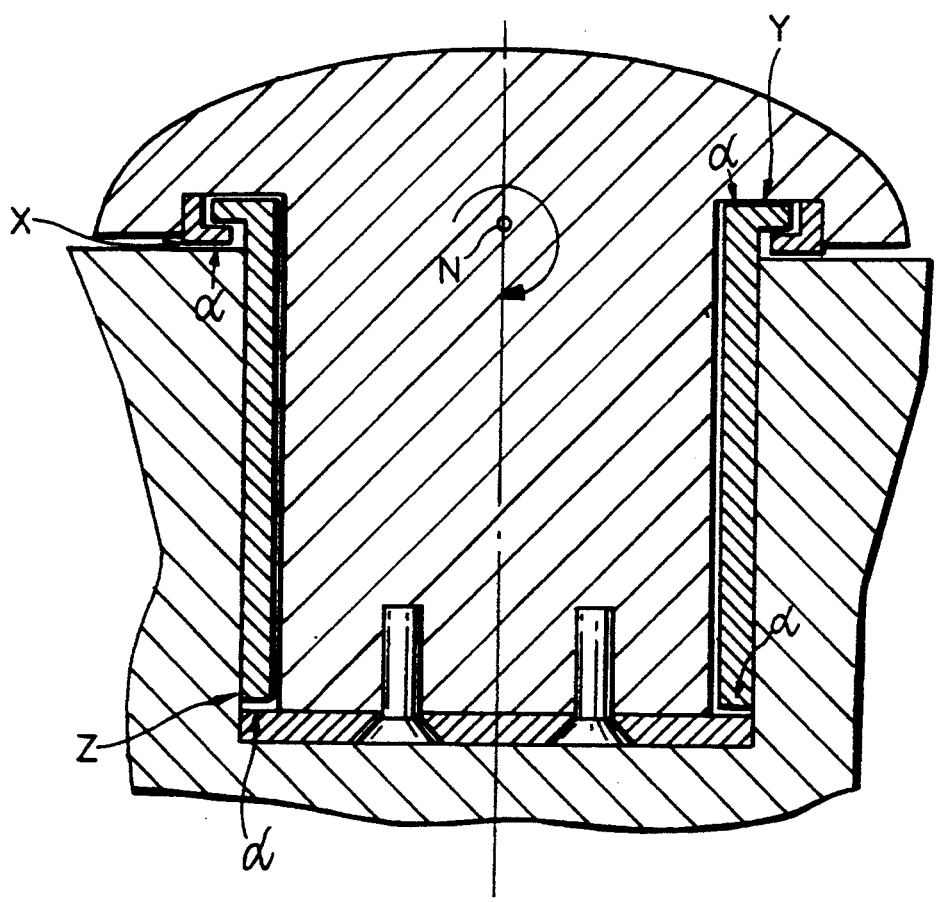
FIG. 4 is a schematic lateral cross sectional view of an integral disc spindle bearing assembly.

How this is done is described in FIG. 4. Any moment of the resultant force about the fulcrum N exerted on the disc within the radius of the spindle, is resisted in the thrust surface X and Y, the resultant force being directed along the length of the spindle. The resultant moment and the force exerted on the disc beyond the radius of the spindle can be expressed as resisted in the thrust surfaces X and Y with the reaction $a$.

Any residual moment is further resisted in the thrust surface Z at the base of the spindle at right angles to its axis of rotation, formed between the retaining plate and the base of the bearing cylinder.

In the event of failure or breakage in the bearing, existing cutting elements tend to fall down the hole necessitating costly recovery operations or even loss of the hole.

In the present invention the top end of the bearing cylinder is held in the disc by a retaining ring, this prevent the disc from becoming detached from the bearing in the event of bearing failure. Since the bearing cylinder is screwed or otherwise fixed into the main body of the bit, the disc cannot fall down the hole during drill, eliminating recovery costs.

Figure 5:
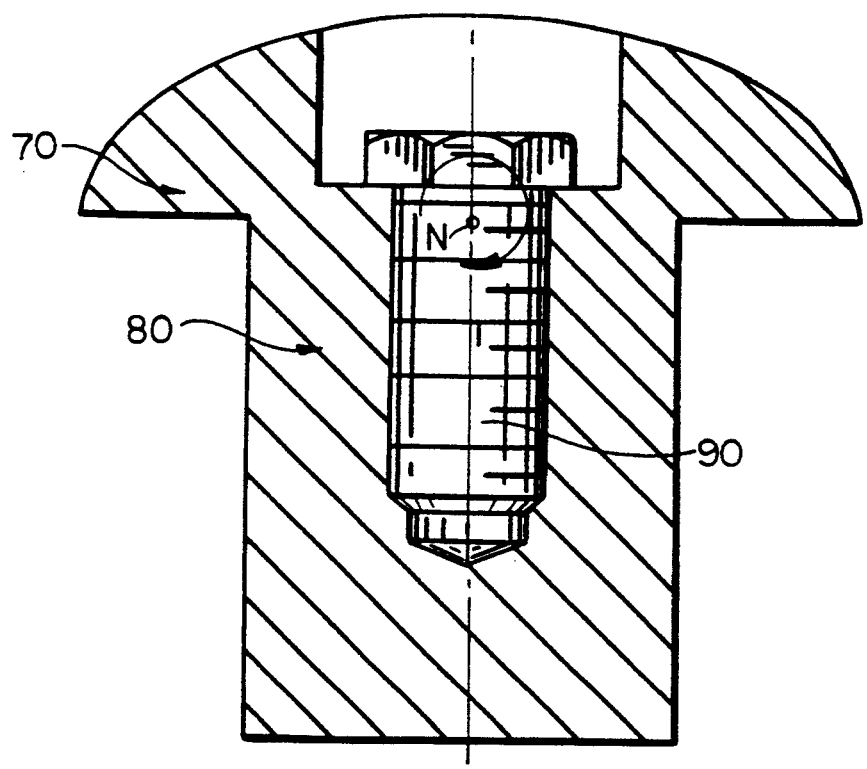
FIG. 5 is a schematic lateral cross sectional view of a disc fastened to a spindle by a bolt.

If the discs (FIG. 5) were to be attached to the spindle 80 by means of a bolt 90 or similar attachment, a flux point would exist between the disc and the top end of the spindle. The moment which tries to rotate the spindle about the fulcrum N would try to separate the disc 70 from the spindle creating massive stress in the bolt leading to fatigue or breakage.

Figure 6:
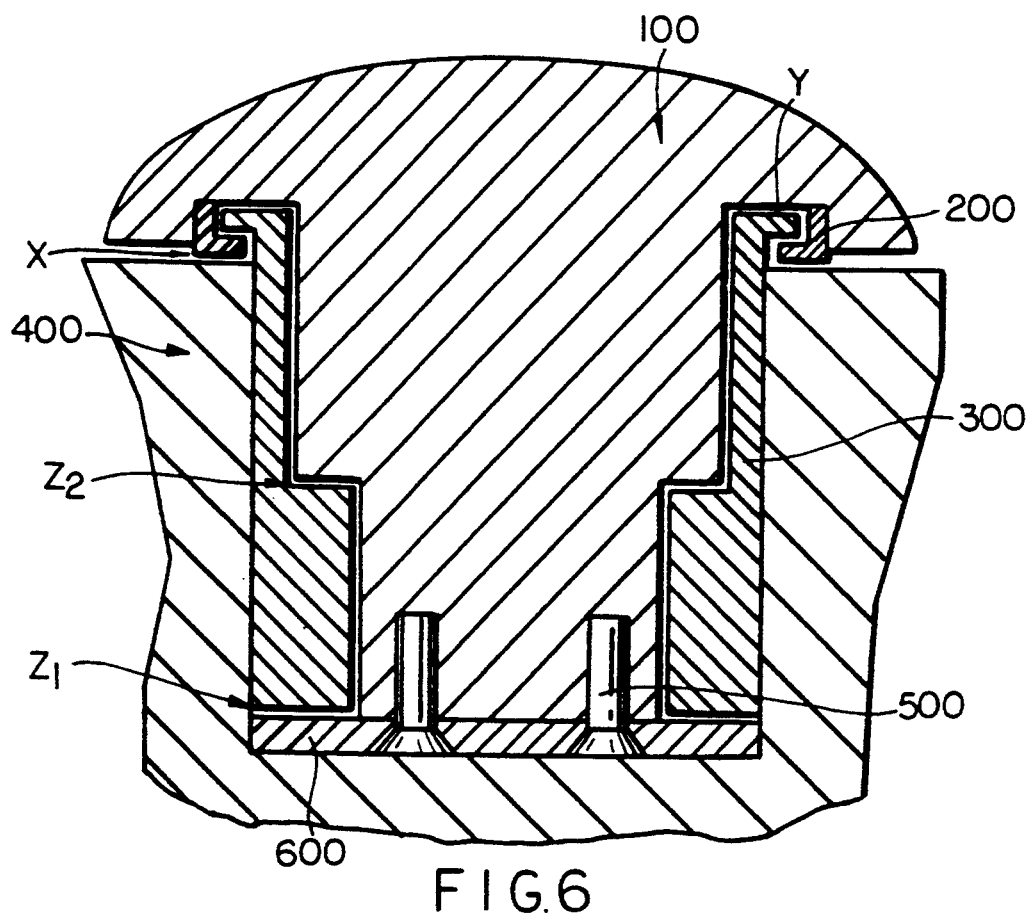
FIG. 6 is a lateral cross sectional view of an integral disc spindle bearing assembly where the bearing diameter is reduced part of the way along its length.

FIG. 6, in accordance with this invention, an integral spindle bearing is assembled as shown in FIG. 2. The diameter of the spindle and the corresponding internal diameter of the bearing 30 are reduced mid-way along their axis to create an additional thrust surface $Z_2$ and the thrust surface $Z_1$, between the base of the bearing cylinder and the retaining plate 600 is enlarged.

Figure 7:
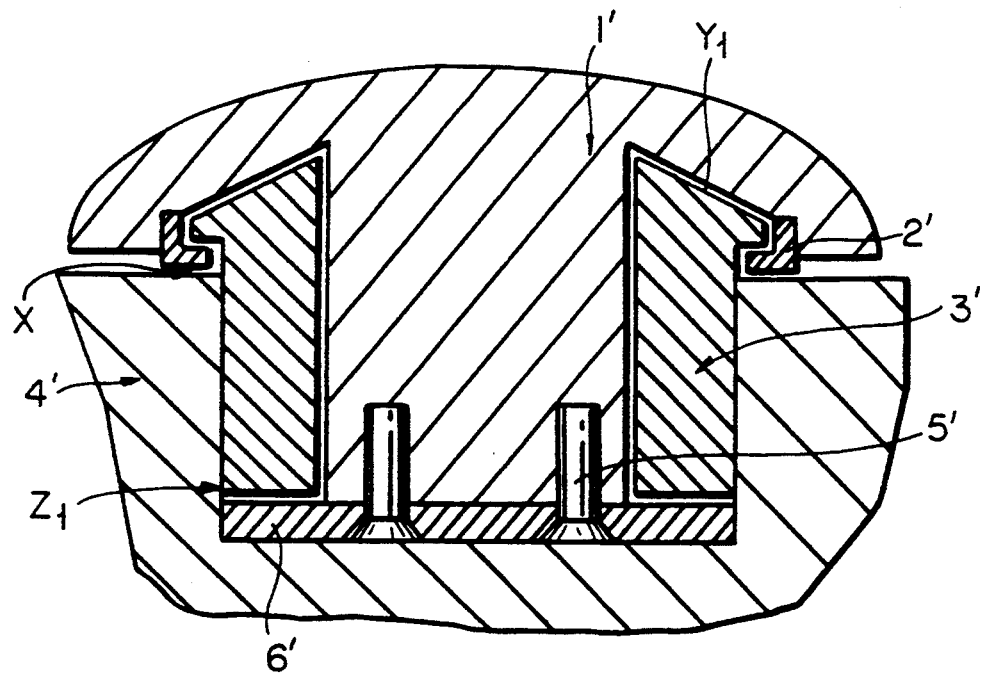
FIG. 7 is a lateral cross sectional view of an integral disc spindle bearing assembly with a large thrust surface in the disc and a short narrow spindle.

In FIG. 7, in accordance with this invention, an integral disc spindle bearing is assembled as shown in FIG. 2. The diameter of the spindle 1' and the corresponding internal diameter of the bearing 3' are reduced and the top of the bearing is tapered. The length of the spindle 1' and the bearing cylinder 3' is reduced. Thrust surfaces at right angles to the axis of the spindle may be seen at X, Y and Z. The bearing 3' is screwed into the main body 4'. The plate 6' is fixed in the spindle by bolts 5'.

Figure 8:
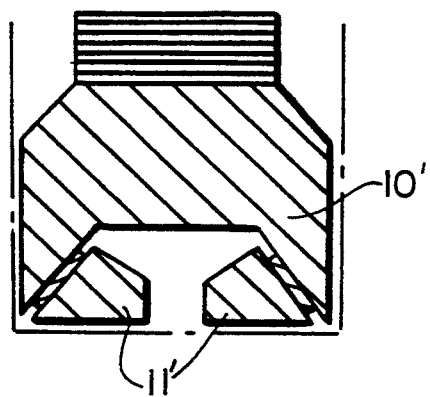
FIG. 8 is a schematic lateral view of a rotary cone bit.

FIG. 8 is a lateral view of a rotary cone bit 10' showing two cones 11'.

Figure 9:
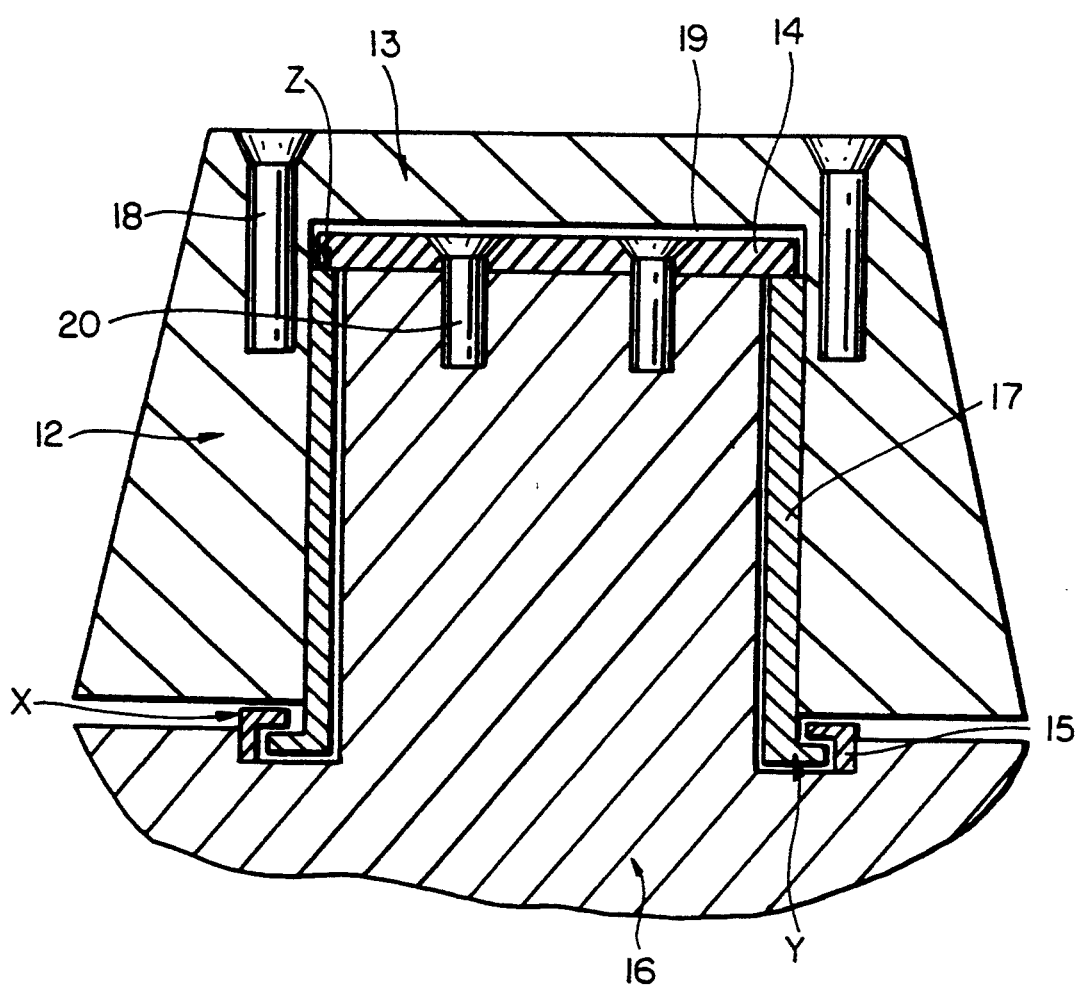
FIG. 9 is a lateral cross sectional view of an integral main body spindle bearing assembly in a cone element.

In FIG. 9, in accordance with this invention, a spindle integral with the main body 16 is set in a bearing cylinder 17 which is fixed into a cutting cone 12. The base of the spindle is attached by fasteners 18. The top end of the bearing cylinder is held in the main body by a retaining ring 15. Thrust surfaces at right angles to the axis of the spindle may be seen at X, Y and Z.

A thrust surface at right angles to the axis of rotation of the spindle is created between the top end of the bearing cylinder and the main body of the bit, and another between the retaining ring and the cutting element.

The main downward thrust rotating torque exerted by the main body of the bit through the cones during the cutting action are concentrated along the lower side of the cones. See FIG. 8.

The forces exerted by the rock in reaction are such that the cone tries to move off center relative to the centerline of the spindle, leading to rapid wear or breakdown in the bearing or fracture of the spindle.

Because the present invention establishes thrust surfaces at right angles to the axis of rotation of the spindle, these forces are inhibited from rotating the cone longitudinally about the fulcrum N enabling the spindle to rotate centrally in the bearing cylinder. This reduces wear in the bearing, avoids premature breakdown and removes the stress which causes the spindle to fracture, increasing the reliability of the bit and prolonging its life.

In the present invention the top end of the bearing cylinder is held in the main body by a retaining ring. This prevents the bearing cylinder, and therefore its cutting element from becoming detached from the main body and failing down the hole in the event of failure or breakdown in the bearing.

Figure 10:
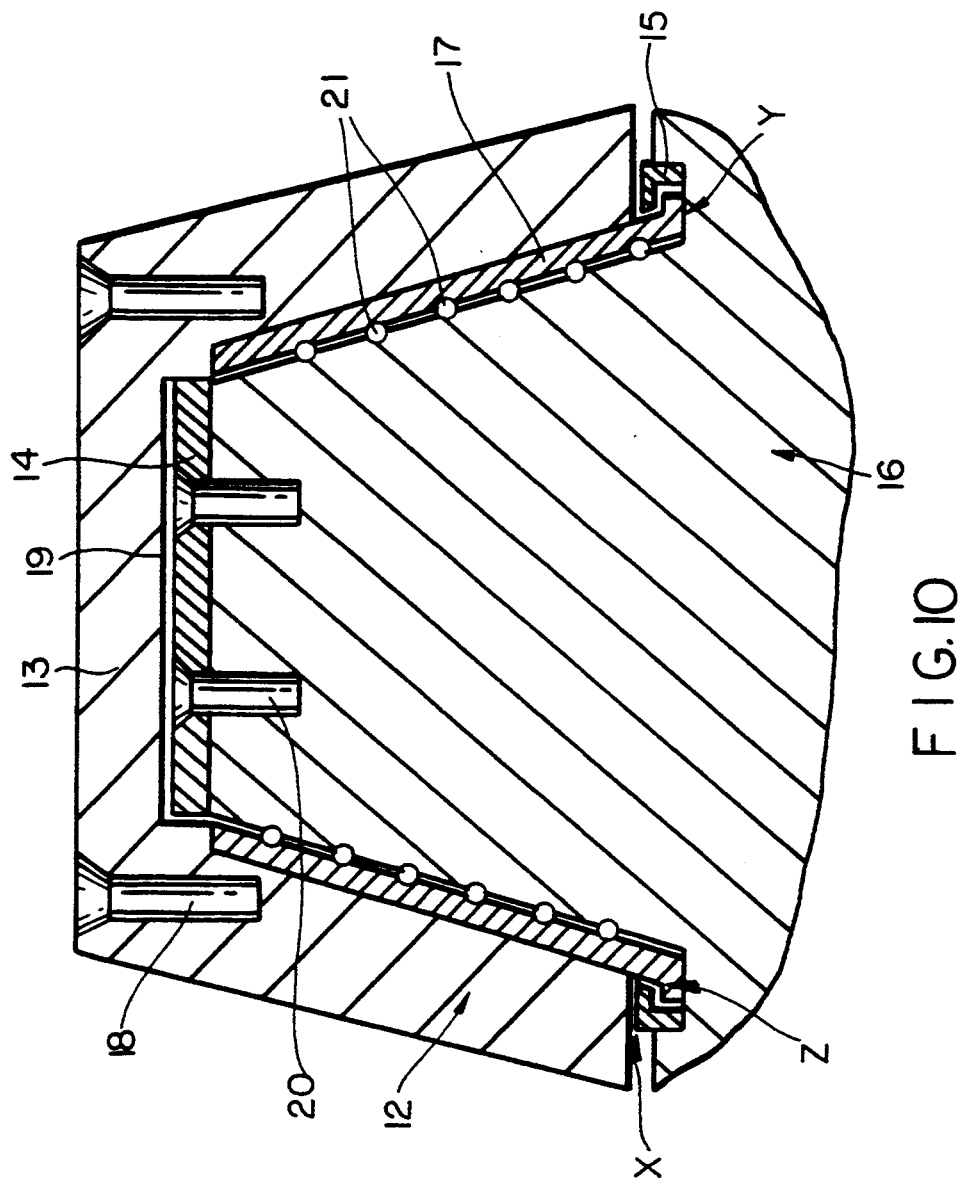
FIG. 10 is a lateral cross-sectional view of an integral main body spindle bearing in a cone cutting element, the bearing being a cone ball-bearing.

In FIG. 10 is shown an assembly similar to this shown in FIG. 9. The bearing element is formed by a cone hollow body 17' provided with balls 21.

Figure 11:
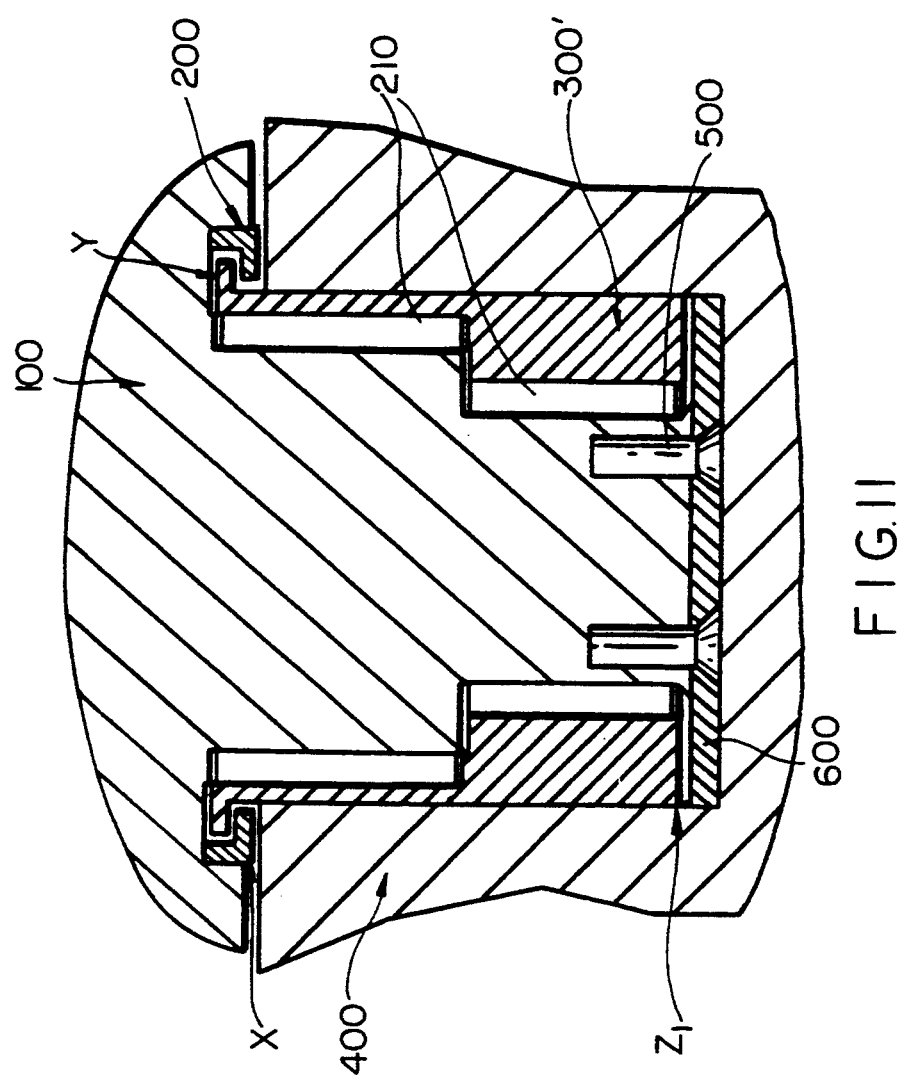
FIG. 11 is a lateral cross-sectional view of an integral disc spindle bearing assembly where the bearing diameter is reduced part of the way along its length and the bearing being a roller-bearing.

In FIG. 11 is shown an assembly similar to this of FIG. 6. The bearing element is formed by a hollow body 300' provided with rollers 210.

Same elements in FIGS. 9 and 10 and in FIGS. 6 and 11 are referred by same numerals.

We claim:

1. A means of mounting a revolving cutting element on a rotary drill bit body by means of a spindle, the spindle having a longitudinal axis, an end and a base, the longitudinal axis of the spindle being the axis of rotation of the cutting element, comprising a bearing element formed by a hollow body element, into which is set the spindle, the bearing element having a shape matching that of the spindle, a plate attached to the end of the spindle and having a portion extended beyond the periphery of the end of the spindle, the end of the bearing element close to the base of the spindle is made with a flange projecting outwards and providing means for coupling with a retaining ring.

2. A means of mounting a revolving cutting element according to claim 1, wherein the spindle is formed integrally with the cutting element, the longitudinal axis of the spindle being the axis of rotation of the cutting element, the bearing element is fixed in the bit body, the bearing element and the plate form a thrust surface with the end of the bearing at right angles to the axis of rotation of the spindle, the other end of the bearing element made with the flange projecting outwards is held in the cutting element by means of the retaining ring which is fixed in the cutting element, a thrust surface at right angles to the axis of the rotation of the spindle is created between the top end of the bearing element and the cutting element and another between the retaining ring and the bit body.

3. A means of mounting a revolving cutting element according to claim 2, in which the diameter of the spindle and the corresponding internal diameter of the bearing element are reduced or increased part of the way along the spindle creating one or more additional thrust surfaces at right angles to the axis of rotation of the spindle.

4. A means of mounting a revolving cutting element according to claim 2 in which the diameter of the spindle and the corresponding internal diameter of the bearing element are reduced and the length of the spindle and the bearing element is reduced to allow for a reverse circulation vent or rock core to pass through the center of the bit body along its axis of rotation.

5. A means of mounting a revolving cutting element according to claim 4 in which the top of the bearing element is tapered.

6. A means of mounting a revolving cutting element according to claim 1 in which the spindle is formed integral with the bit body, the longitudinal axis of the spindle being the axis of rotation of the cutting element, the bearing element is fixed in the cutting element, the plate is set in a cylindrical cavity in the head of the cutting element which is attached to the cutting element, and a thrust surface between the plate and the base of the bearing element is created at right angles to the axis of rotation of the spindle, the other end of the bearing element is held in the body of the bit by means of the retaining ring fixed in the main body, a thrust surface at right angles to the axis of rotation of the cutting element is created between the top end of the bearing element and the bit body and another between the retaining ring and the cutting element.

7. A means of mounting a revolving cutting element according to one of the claims 1 to 6 in which the shape of the spindle and the bearing element is cylindrical.

8. A means of mounting a revolving cutting element acording to one of the claims 1 to 6 in which the shape of the spindle and the bearing element is conical.

9. A means of mounting a revolving cutting element according to claim 6 in which the cutting element is a cone.

10. A means of mounting a revolving cutting element according to claim 2 in which the cutting element is a disc.

11. A means of mounting a revolving cutting element according to claim 1 in which the bearing element is formed by a hollow body element provided with balls.

12. A means of mounting a revolving cutting element according to claim 1 in which the bearing element is formed by a hollow body element provided with rollers.

* * * * *